US012593217B2

(12) United States Patent
Vercillo et al.

(10) Patent No.: US 12,593,217 B2
(45) Date of Patent: Mar. 31, 2026

(54) SYSTEMS AND METHODS FOR MANAGING APPLICATION AUTHENTICATION IN A WIRELESS NETWORK

(71) Applicant: T-Mobile Innovations LLC, Overland Park, KS (US)

(72) Inventors: David Vercillo, Carbonado, WA (US); Anthony Yiu, Newcastle, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 109 days.

(21) Appl. No.: 18/394,033

(22) Filed: Dec. 22, 2023

(65) Prior Publication Data

US 2025/0211999 A1      Jun. 26, 2025

(51) Int. Cl.
H04L 12/66 (2006.01)
H04L 61/5007 (2022.01)
H04W 12/37 (2021.01)
H04W 12/73 (2021.01)

(52) U.S. Cl.
CPC ......... H04W 12/73 (2021.01); H04L 61/5007 (2022.05); H04W 12/37 (2021.01)

(58) Field of Classification Search
None
See application file for complete search history.

(56) References Cited

U.S. PATENT DOCUMENTS 8,769,626 B2 *   7/2014   Gundavelli ........... H04W 28/02
                                                  726/4
9,473,478 B2 *  10/2016   Subramanian ........ H04W 48/14
10,750,350 B1 *  8/2020   Gundavelli ............. H04W 8/26
2004/0268148 A1 * 12/2004 Karjala ................. H04L 63/083
                                                  713/150
2012/0096120 A1  4/2012   Couillabin et al.
2013/0294591 A1 * 11/2013 Shaw ................ H04M 3/53333
                                                  379/88.13
2014/0129728 A1 *  5/2014  Alex ................... H04L 61/4511
                                                  709/228
2021/0099871 A1 *  4/2021  Bhatnagar ............. H04W 88/10
2023/0308467 A1   9/2023   Koral et al.

* cited by examiner

*Primary Examiner* — Christopher B Robinson
(74) *Attorney, Agent, or Firm* — Jones Burke, PLLC

(57) ABSTRACT

Systems and methods are provided for authenticating applications in a wireless network. Methods include determining that an application uses IP authentication. The methods further include querying a policy server for information on an IP address of a client running the application, wherein the information includes a device type indicator for the IP address. The methods further include determining that the device type indicator indicates the IP address is assigned to a cellular home internet gateway. The methods further include transmitting a notification to the client running the application upon determining that the IP address is assigned to the cellular home internet gateway.

19 Claims, 4 Drawing Sheets

300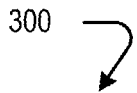

DETERMINE THAT THE APPLICATION USES IP
AUTHENTICATION
310

QUERY A POLICY SERVER FOR INFORMATION ON
AN IP ADDRESS OF A CLIENT RUNNING THE
APPLICATION, WHEREIN THE INFORMATION
INCLUDES A DEVICE TYPE INDICATOR
320

DETERMINE THAT THE DEVICE TYPE INDICATOR
INDICATES THAT THE IP ADDRESS IS ASSIGNED TO
A CELLULAR HOME INTERNET GATEWAY
330

TRANSMIT A NOTIFICATION TO THE CLIENT
RUNNING THE APPLICATION UPON DETERMINING
THAT THE IP ADDRESS IS ASSIGNED TO THE
CELLULAR HOME INTERNET GATEWAY
340

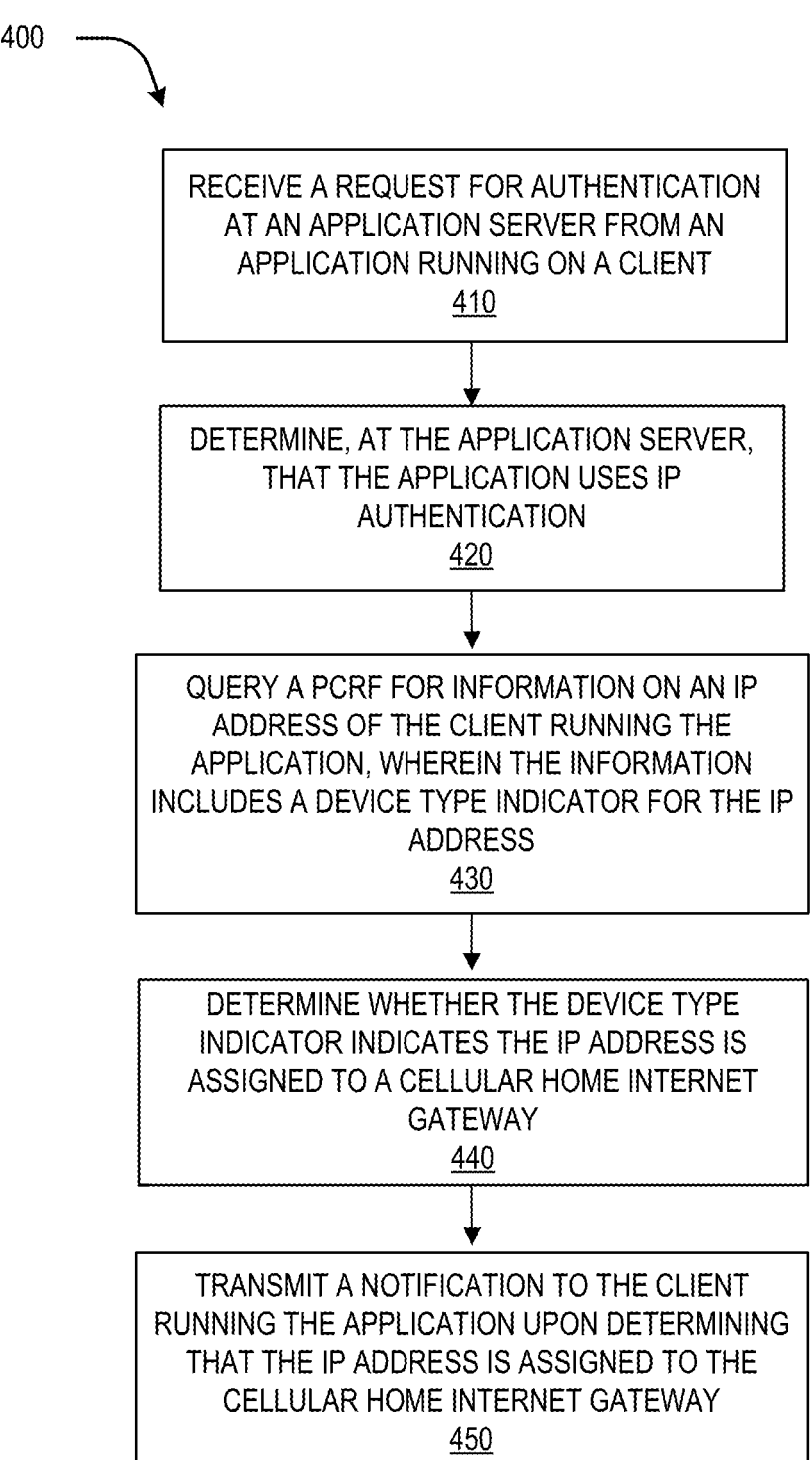

RECEIVE A REQUEST FOR AUTHENTICATION
AT AN APPLICATION SERVER FROM AN
APPLICATION RUNNING ON A CLIENT
410

DETERMINE, AT THE APPLICATION SERVER,
THAT THE APPLICATION USES IP
AUTHENTICATION
420

QUERY A PCRF FOR INFORMATION ON AN IP
ADDRESS OF THE CLIENT RUNNING THE
APPLICATION, WHEREIN THE INFORMATION
INCLUDES A DEVICE TYPE INDICATOR FOR THE IP
ADDRESS
430

DETERMINE WHETHER THE DEVICE TYPE
INDICATOR INDICATES THE IP ADDRESS IS
ASSIGNED TO A CELLULAR HOME INTERNET
GATEWAY
440

TRANSMIT A NOTIFICATION TO THE CLIENT
RUNNING THE APPLICATION UPON DETERMINING
THAT THE IP ADDRESS IS ASSIGNED TO THE
CELLULAR HOME INTERNET GATEWAY
450

FIG. 4

SYSTEMS AND METHODS FOR MANAGING APPLICATION AUTHENTICATION IN A WIRELESS NETWORK

TECHNICAL BACKGROUND

Many wireless phone users have plans that limit their monthly data usage. One common method of helping prevent charges for going over the limit, is to connect their phone to Wi-Fi and use that data connection whenever possible. The most common occurrence of this is when the user is at home and most modern phones can be configured to automatically connect to a user's home Wi-Fi when they arrive at home. Cellular network provided home internet access is becoming more common. Many users are connecting to the internet from behind their cellular home internet gateways. A cellular home internet gateway device will contain a SIM card or equivalent to connect to the provider's cellular network. These gateways will often appear as if they are a mobile device to other network devices. Some mobile device applications are not able to handle the situation where the mobile phone is behind a gateway device that appears to them as a mobile device.

OVERVIEW

Examples described herein include systems and methods for managing application authentication in a wireless network. An exemplary method includes determining that the application uses IP authentication. The method further includes querying a policy server for information on the IP address of a client running the application, wherein the information includes a device type indicator for the IP address. The method further includes determining that the device type indicator indicates that the IP address is assigned to a cellular home internet gateway. The method further includes transmitting a notification to the client running the application upon determining that the IP address is assigned to the cellular home internet gateway.

Another exemplary embodiment includes a system including a policy server, an application server, and an entitlement server. The application server including at least one electronic processor configured to perform application operations. The application operations including receiving a request for authentication from an application and determining that the application uses IP authentication. The entitlement server including at least one electronic processor configured to perform entitlement operations. The entitlement operations including querying the policy server for information on an IP address of a client running the application, wherein the information includes a device type indicator for the IP address. The entitlement operations further including determining that the device type indicator indicates that the IP address is assigned to a cellular home internet gateway. The entitlement operations further including transmitting a notification to the client running the application upon determining that the IP address is assigned to the cellular home internet gateway.

Another exemplary embodiment includes a method or managing application authentication in a wireless network. The method includes receiving a request for authentication, at an application server, from an application running on a client. The method further includes determining, at the application server, that the application uses IP authentication. The method further includes querying a Policy Control and Charging Rules Function server (PCRF) for information on an IP address of the client running the application, wherein the information includes a device type indicator for the IP address. The method further includes determining whether the device type indicator indicates the IP address is assigned to a cellular home internet gateway. The method further includes transmitting a notification to the client running the application upon determining that the IP address is assigned to the cellular home internet gateway.

BRIEF DESCRIPTION OF THE DRAWINGS

These and other more detailed and specific features of various embodiments are more fully disclosed in the following description, reference being had to the accompanying drawings, in which:

FIG. 3 illustrates an exemplary process flow for managing application authentication in a wireless network; and FIG. 4 illustrates an exemplary process flow for managing application authentication in a wireless network.

DETAILED DESCRIPTION

Figure 1:
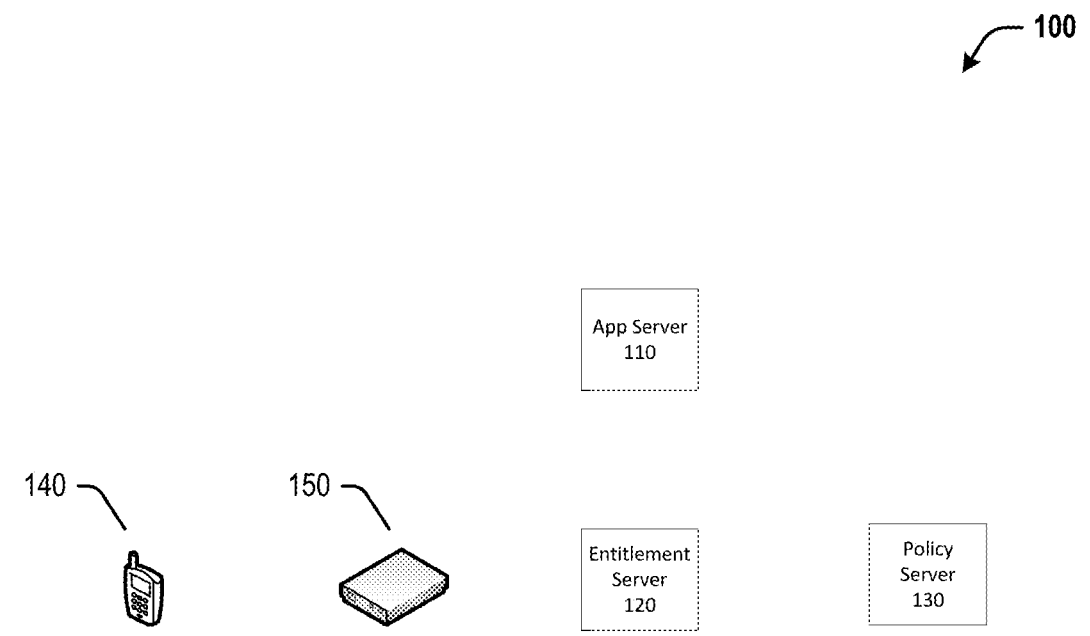
FIG. 1 illustrates an exemplary system for application authentication in a wireless network in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by a wireless provider. One of the main functions of a modern wireless network is providing data traffic for subscriber's wireless devices. This data traffic allows many benefits to the subscriber, including internet access and many applications that require data traffic to properly function. Some applications require the wireless devices to authenticate with the wireless network in order to prove that the wireless device is authorized to be using that application and to identify the specific wireless device. One such application is the visual voicemail application provided by the wireless provider. Before visual voicemail, a subscriber would be required to make a voice call to the wireless provider to listen to recorded voicemail. With visual voicemail, the subscriber can access the voicemails from their mobile phones with a much better interface including seeing a list of voicemails and being able to pick any one from the list to listen to at any time. In order to function, visual voicemail must authenticate with the wireless network so that the application knows which phone number's voicemail should be served to the mobile device running the application.

Visual voicemail is an example of one of many applications that authenticate by way of IP authentication. This means that the application uses the IP address of the wireless device while determining whether the wireless device is authorized and for determining the identity of the wireless device trying to access the application. For some wireless devices, it can be determined that an application uses IP authentication and needs to have its IP address confirmed by querying an application category attribute. The application category attribute will indicate that the IP address provided during IP authentication must be checked to confirm it is the IP address of the wireless device running the application rather than the cellular home internet gateway. In some instances the application may provide that information in other ways, for example by providing the IP address in the authentication request. Other methods are possible and may be used in the disclosed systems and methods. Typically, the application running on the wireless device connects to an application server when trying to function. The application then contacts an entitlement server to aid in the authentication process. The entitlement server queries a policy server, such as a Policy Control and Charging Rules Function (PCRF) server, for information on the device requesting the authentication. This information includes the International Mobile Subscriber Identity/Mobile Station International Subscriber Directory Number (IMSI/MSISDN) of the client. This query may be performed as a Lightweight directory access protocol (LDAP) query.

A device connected to the internet will be assigned an IP address. The IP address that identifies that device on the internet is often called its public IP. If a device is connected to the internet from behind a gateway, the device will have a private IP for functionality within the network provided by the gateway and the gateway itself will have a public IP which is shared by all of the devices connecting to the internet from behind the gateway. If the wireless device is directly connected to the cellular network, the wireless device's IP is looked up and the information on the wireless device's IMSI/MSISDN is returned. However, if the wireless device is attached to the cellular network from behind a cellular home internet gateway, the gateway's IP is looked up and information on the home internet gateway's IMSI/MSISDN, and not the IMSI/MSISDN of the wireless device is returned. This is because the application is only aware of the wireless device's public IP, not its private IP. In this case, the application is unable to authenticate because the home internet gateway's IMSI/MSISDN is returned, and not that of the actual requesting wireless device. For example, the voicemail information available for the home internet gateway is returned rather than the voicemail information for the wireless device running the visual voicemail application. The home internet gateway itself would have no voicemail information to return to the application since it is a gateway device rather than a mobile phone. The user is not able to properly use the application while connected to the cellular home internet gateway.

A cellular home internet gateway is any device that connects to a cellular network provider's cellular network and provides access to the cellular data network to other devices, such as mobile phones or tablets. The gateway would have a SIM card or equivalent used to connect to the cellular provider's cellular network. For example, the gateway may be a single device that acts as a modem and router to connect itself to the cellular data network and then provide access for other devices by providing a Wi-Fi network and routing the Wi-Fi traffic to the cellular data network.

When the entitlement server queries the policy server, it is unknown whether the IP address is the public IP of the actual wireless device, or the public IP of the home internet gateway being used to provide network access to the wireless device. While querying the policy server for information on the IP address, much more information than just the IMSI/MSISDN may be returned. There may be an indicator of the device type of the device assigned the IP address. For example, the "calledstationid" attribute is used to store the Access Point Name (APN) for the device. The APN is used by cellular providers to determine what type of network connection the device is seeking from the provider's network. Each provider controls the APN for the various types of connections they provide. The APN used for 5G networks may be different than an APN for 4G networks. An APN for a cellular home internet gateway is different than APNs used for mobile phones or other types of devices. Therefore the "calledstationid" in this example may be considered a device type indicator as it may indicate whether the IP address being looked up is assigned to a cellular home internet gateway or some other type of device.

By checking whether the IP address being looked up is a cellular home internet gateway or something else, it can be determined whether the IP authentication process is effective for the actual device requesting the authentication. If the IP address is for a cellular home internet gateway, a notification may be sent to the wireless device that originally requested the application authentication. That notification may, for example, instruct the user to disconnect from the gateway to connect to the cellular network by way of the wireless device's own network connection so that the application will function as expected. The notification may include a custom response code and it may trigger a process within the application to disconnect the client device from the gateway with or without user intervention or notification.

During the application authentication process, a security token, such as a Service Instance Token (SIT) may be created for the application. This security token may be queried by the application to determine whether it is authorized to use the relevant features of the application. Within this new process for authenticating an application, the security token may or may not be created if the wireless device running the application is connected to the cellular network from behind a cellular home internet gateway. This is because the security token is unnecessary at that point since the application cannot adequately function in this situation.

FIG. 1 depicts an exemplary system 100 for managing application authentication in a wireless network. System 100 includes an application server 110, an entitlement server 120 and a policy server 130. The application server 110 may provide application support for applications such as visual voicemail or scam protection security software, for example. The entitlement server 120 may provide many additional functions beyond what is explained here and may be an instance of Secure Entitlement Server (SES), for example. The policy server 130 may be a Policy Control Function server (PCF) or a Policy Control and Charging Rules Function server (PCRF), for example.

System 100 also depicts a cellular home internet gateway 150 and a wireless device 140. A cellular home internet gateway 150 is any device that connects to a cellular network provider's cellular network and provides access to the cellular data network to other devices, such as mobile phones, tablets, laptops, desktops, or streaming devices, such as TVs. For example, it may be a single device that acts as a modem and router to connect itself to the cellular data network and then provide access for other devices by providing an ethernet or Wi-Fi network and routing the ethernet or Wi-Fi traffic to the cellular data network. Wireless device 140 may be any device that has a SIM card or equivalent and is capable of connecting directly to the cellular provider's cellular network and is also capable of connecting to the cellular home internet gateway 150. A single wireless device 140 is shown for simplicity, but many may exist and may include phones, tablets, PDAs, smart watches or other similar devices.

In operation, the system 100 may be configured such that the wireless device 140 executes applications, some of which need to be authenticated to the cellular provider's network. It may be determined that the application running on wireless device 140 uses IP authentication. The policy server 130 may be queried for information on the IP address of the wireless device 140, the information including the IMSI/MSISDN and a device type indicator corresponding to the IP address. As previously discussed, the device type indicator may take the form of an APN. What is unknown at this point is whether the IP address being used is the public IP of the actual wireless device 140 or whether it is the public IP address of cellular home internet gateway 150. The device type indicator may indicate that the IP address being looked up is assigned to the cellular home internet gateway 150 and if so, a notification is transmitted to the wireless device 140. The notification may, for example, instruct the user to disconnect the wireless device 140 from the gateway 150 to connect to the cellular network by way of the wireless device's 140 own network connection so that the application functions as expected. The notification may include a custom response code and it may trigger a process within the application to disconnect the wireless device 140 from the gateway 150 with or without user intervention or notification.

Other network elements may be present in system 100 to facilitate communication but are omitted for clarity, such as access nodes, base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements.

Figure 2:
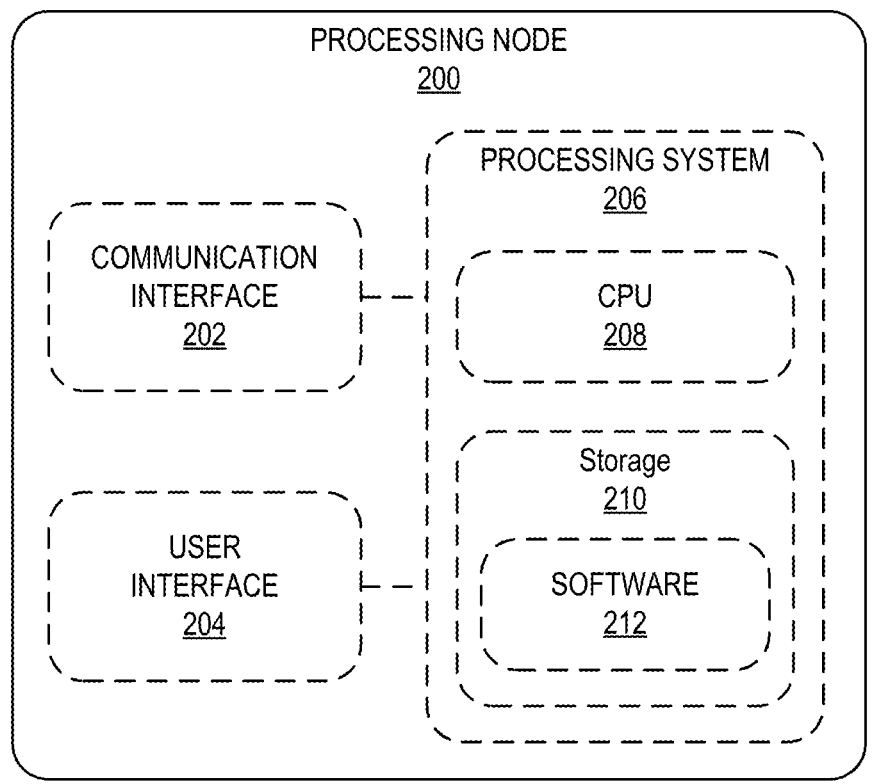
FIG. 2 illustrates an exemplary processing node in accordance with various aspects of the present disclosure.

FIG. 2 depicts an exemplary processing node 200 useful for managing application authentication in a wireless network. The processing node 200 includes a communication interface 202, user interface 204, and processing system 206 in communication with communication interface 202 and user interface 204. Processing system 206 includes a processor 208, storage 210, which can comprise a disk drive, flash drive, memory circuitry, or other memory device including, for example, a buffer. Storage 210 can store software 212 which is used in the operation of the processing node 200. Software 212 may include computer programs, firmware, or some other form of machine-readable instructions, including an operating system, utilities, drivers, network interfaces, applications, or some other type of software. Processing system 206 may include a microprocessor 208 and other circuitry to retrieve and execute software 212 from storage 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200. Processing node 200 may be a part of a server such as those shown in FIG. 1, including the application server 110, entitlement server 120, and policy server 130.

In an exemplary embodiment, software 212 can include instructions for receiving a request for authentication from an application and determining that the application uses IP authentication. The instructions may further include querying the policy server for information on an IP address of a client running the application, wherein the information includes a device type indicator for the IP address. The instructions may further include determining that the device type indicator indicates that the IP address is assigned to a cellular home internet gateway and if so, transmitting a notification to the client running the application.

FIG. 3 illustrates an exemplary method 300 for managing application authentication in a wireless network. Method 300 may be performed by any suitable combination of processors, such as processing node 200. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 300 begins in step 310 where it is determined that the application uses IP authentication. For some wireless devices, it can be determined that an application uses IP authentication and needs to have its IP address confirmed by querying an application category attribute. The application category attribute will indicate that the IP address provided during IP authentication must be checked to confirm it is the IP address of the wireless device running the application rather than the cellular home internet gateway. In some instances, the application may provide that information in other ways, for example by providing the IP address in the authentication request. Other manners of determination are possible and may be used in the disclosed method. Method 300 continues in step 320 where a policy server is queried for information on the IP address of a client running the application, wherein the information includes a device type indicator. The device type indicator may be an APN, for example. Method 300 continues in step 330 where it is determined that the device type indicator indicates that the IP address is assigned to a cellular home internet gateway. Method 300 continues in step 340 where a notification is transmitted to the client running the application upon determining that the IP address is assigned to the cellular home internet gateway. The notification may, for example, instruct the user to disconnect the client from the gateway to connect to the cellular network by way of the client's own network connection so that the application functions as expected. The notification may include a custom response code and it may trigger a process within the application to disconnect the client from the gateway with or without user intervention or notification.

Method 300 may include an optional step of providing a security token for the client running the application. The security token may be configured to deny access to the application's features if it is determined that the IP address is assigned to the cellular home internet gateway.

FIG. 4 illustrates an exemplary method 400 for managing application authentication in a wireless network. Method 400 may be performed by any suitable combination of processors, such as processing node 200. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 400 begins in step 410 where a request for authentication from an application running on a client is received at an application server. Method 400 continues in step 420 where it is determined at the application server that the application uses IP authentication. For some wireless devices, it can be determined that an application uses IP authentication and needs to have its IP address confirmed by querying an application category attribute. The application category attribute will indicate that the IP address provided during IP authentication must be checked to confirm it is the IP address of the wireless device running the application rather than the cellular home internet gateway. In some instances, the application may provide that information in other ways, for example by providing the IP address in the authentication request. Other manners of determination are possible and may be used in the disclosed method. Method 400 continues in step 430 where a PCRF server is queried for information on the IP address of the client running the application, wherein the information includes a device type indicator for the IP address. The device type indicator may be an APN, for example. Method 400 continues in step 440 where it is determined whether the device type indicator indicates that the IP address is assigned to a cellular home internet gateway. Method 400 continues in step 450 where a notification is transmitted to the client running the application upon determining that the IP address is assigned to the cellular home internet gateway. The notification may, for example, instruct the user to disconnect the client from the gateway to connect to the cellular network by way of the client's own network connection so that the application functions as expected. The notification may include a custom response code and it may trigger a process within the application to disconnect the client from the gateway with or without user intervention or notification.

Method 400 may include the optional step of providing a security token to the client running the application. The security token may be configured to deny or allow access to the application's features depending on whether it is determined that the IP address is assigned to a cellular home internet gateway or not. For example, if the application is a visual voicemail application, the client may be denied access to the stored voicemails, or the entire visual voicemail application, if the IP address is determined to be assigned to a cellular home internet gateway. The gateway would not have any voicemail. However, if it is determined that the IP address is assigned to something else, such as a phone, the client may be granted access to the stored voicemail in the visual voicemail application.

In some embodiments, methods 300 and 400 may include additional steps or operations. Furthermore, the methods may include steps shown in each of the other methods. As one of ordinary skill in the art would understand, the methods of 300 and 400 may be integrated in any useful manner and the steps may be performed in any useful sequence.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of authenticating an application in a wireless network, the method comprising:
   determining that the application uses IP authentication;
   querying a policy server for information on an IP address of a client running the application, wherein the information includes a device type indicator for the IP address;
   determining that the device type indicator indicates that the IP address is assigned to a cellular home internet gateway; and
   transmitting a notification to the client running the application upon determining that the IP address is assigned to the cellular home internet gateway, wherein the notification to the client running the application causes the application to disconnect the client from the cellular home internet gateway.

2. The method of claim 1, wherein the device type indicator is an Access Point Name (APN).

3. The method of claim 1, wherein the notification to the client directs a user of the client to disconnect the client from the cellular home internet gateway.

4. The method of claim 1, wherein the determining that the application uses IP authentication is performed in part by querying an application category attribute.

5. The method of claim 1, wherein the method further comprises:
   providing a security token to the client running the application.

6. The method of claim 5, wherein the security token is configured to deny access to the application's feature if it is determined that the IP address is assigned to the cellular home internet gateway.

7. A system, the system comprising:
   a policy server;
   an application server;
   an entitlement server including at least one electronic processor configured to perform entitlement operations, the entitlement operations including:
   receiving a request for authentication from an application;
   determining that the application uses IP authentication;
   querying the policy server for information on an IP address of a client running the application, wherein the information includes a device type indicator for the IP address;
   determining that the device type indicator indicates that the IP address is assigned to a cellular home internet gateway; and
   transmitting a notification to the client running the application upon determining that the IP address is assigned to the cellular home internet gateway.

8. The system of claim 7, wherein the device type indicator is an Access Point Name (APN).

9. The system of claim 7, wherein the notification to the client directs a user of the client to disconnect the client from the cellular home internet gateway.

10. The system of claim 7, wherein the notification to the client running the application causes the application to disconnect the client from the cellular home internet gateway.

11. The system of claim 7, wherein the determining that the application uses IP authentication is performed in part by querying an application category attribute.

12. The system of claim 7, wherein the entitlement operations further include:

provides a security token to the client running the application.

13. The system of claim 12, wherein the security token is configured to deny access to the application's feature if it is determined that the IP address is assigned to the cellular home internet gateway.

14. A method of authenticating an application in a wireless network, the method comprising:

receiving a request for authentication, at an entitlement server, from an application running on a client;

determining, at the entitlement server, that the application uses IP authentication;

querying a Policy Control and Charging Rules Function server (PCRF) for information on an IP address of the client running the application, wherein the information includes a device type indicator for the IP address;

determining whether the device type indicator indicates the IP address is assigned to a cellular home internet gateway; and transmitting a notification to the client running the application upon determining that the IP address is assigned to the cellular home internet gateway, wherein the notification to the client running the application causes the application to disconnect the client from the cellular home internet gateway.

15. The method of claim 14, the method further comprising:

providing a security token to the client running the application.

16. The method of claim 15, wherein the security token is configured to allow the client to access the application's features if the device type indicator indicates the IP address is assigned to something other than the cellular home internet gateway.

17. The method of claim 15, wherein the security token is configured to deny access to the application's features if it is determined that the IP address is assigned to the cellular home internet gateway.

18. The method of claim 14, wherein no security token is provided to the client running the application if it is determined that the IP address is assigned to something other than the cellular home internet gateway.

19. The method of claim 14, wherein the application is a visual voicemail application and the application's features include stored voicemails.

\* \* \* \* \*